(12) United States Patent
Chiu et al.

(10) Patent No.: US 12,003,299 B2
(45) Date of Patent: Jun. 4, 2024

(54) CHANNEL STATE INFORMATION MEASUREMENT METHOD AND ASSOCIATED WIRELESS COMMUNICATION CHIP AND ELECTRONIC DEVICE

(71) Applicant: MEDIATEK INC., Hsin-Chu (TW)

(72) Inventors: Po-Jung Chiu, Hsinchu (TW); I-Cheng Tsai, Hsinchu (TW); Ching-Chia Cheng, Hsinchu (TW); Shun-Yong Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 136 days.

(21) Appl. No.: 17/409,817

(22) Filed: Aug. 24, 2021

(65) Prior Publication Data

US 2022/0166479 A1 May 26, 2022

Related U.S. Application Data

(60) Provisional application No. 63/118,614, filed on Nov. 25, 2020.

(51) Int. Cl.
  *H04B 7/06* (2006.01)
  *H04B 17/309* (2015.01)
  *H04H 20/12* (2008.01)

(52) U.S. Cl.
  CPC ......... *H04B 7/0626* (2013.01); *H04B 17/309* (2015.01); *H04H 20/12* (2013.01)

(58) Field of Classification Search
  None
  See application file for complete search history.

(56) References Cited

U.S. PATENT DOCUMENTS

| | | | |
|---|---|---|---|
| 8,798,695 B1 * | 8/2014 | Zheng | H01Q 21/28 455/575.7 |
| 9,445,237 B1 | 9/2016 | Nallampatti Ekambaram | |
| 11,552,392 B2 * | 1/2023 | Jung | H01Q 21/061 |
| 2014/0126436 A1 | 5/2014 | Safavi | |
| 2015/0381261 A1 * | 12/2015 | Yokosawa | H04B 17/40 455/16 |
| 2016/0269859 A1 * | 9/2016 | Nallampatti Ekambaram | G01S 3/043 |
| 2017/0033463 A1 * | 2/2017 | Tinaphong | H01Q 19/30 |
| 2019/0116627 A1 | 4/2019 | Min | |
| 2019/0379434 A1 * | 12/2019 | Lindskog | G01P 13/04 |

FOREIGN PATENT DOCUMENTS

| | | |
|---|---|---|
| CN | 104037500 A | 9/2014 |
| CN | 110035138 A | 7/2019 |
| CN | 111147115 A | 5/2020 |
| WO | 2021/150968 A1 | 7/2021 |

* cited by examiner

*Primary Examiner* — Minh Trang T Nguyen
(74) *Attorney, Agent, or Firm* — Winston Hsu

(57) ABSTRACT

The present invention provides an electronic device including a first antenna, a second antenna and a wireless communication chip. The wireless communication chip is configured to control the first antenna to broadcast a packet, control the second antenna to receive the packet broadcasted from the first antenna, and determine channel state information according to the packet received by the second antenna.

17 Claims, 4 Drawing Sheets

CHANNEL STATE INFORMATION MEASUREMENT METHOD AND ASSOCIATED WIRELESS COMMUNICATION CHIP AND ELECTRONIC DEVICE

CROSS REFERENCE TO RELATED APPLICATIONS

This application claims the priority of US Provisional Application No. 63/118,614 (filed on Nov. 25, 2020), which is included herein by reference in its entirety.

BACKGROUND

In wireless communications, channel state information (CSI) refers to known channel properties of a communication link. The CSI describes how a signal propagates from a transmitter to a receiver and represents the combined effect of, for example, scattering, fading, and power decay with distance. Recently, some applications use CSI to do the sensing detection, for example, the CSI variation can be detected to perform user behavior recognition.

In Wi-Fi scenario, the CSI is obtained by using a pair device, that is a first device serves as the transmitter to send a packet, and a second device serves as the receiver to receive the packet to estimate the CSI. However, this means that the CSI can be estimated only when there are two devices, which will cause inconvenience to the user. In addition, the CSI variation will be changed due to the environment setup, that is changes in the surrounding environment will increase a difficulty of sensing detection.

SUMMARY

It is therefore an objective of the present invention to provide a CSI measurement method, which can use a single electronic device to obtain the CSI for the sensing detection, to solve the above-mentioned problems.

According to one embodiment of the present invention, an electronic device comprising a first antenna, a second antenna and a wireless communication chip is disclosed. The wireless communication chip is configured to control the first antenna to broadcast a packet, control the second antenna to receive the packet broadcasted from the first antenna, and determine channel state information according to the packet received by the second antenna.

According to another embodiment of the present invention, a wireless communication chip comprising a transmitting circuit, a receiving circuit and a processing circuit is disclosed. The transmitting circuit is arranged to couple to a first antenna external to the wireless communication chip. The receiving circuit is arranged to couple to a second antenna external to the wireless communication chip. The processing circuit is configured to control the transmitting circuit to broadcast a packet via the first antenna, control the receiving circuit to receive the packet via the second antenna, and determine channel state information according to the packet received by the receiving circuit.

According to another embodiment of the present invention, a channel state information measurement method comprises the steps of: controlling a first antenna within an electronic device to broadcast a packet; controlling a second antenna within the electronic device to receive the packet; and determining channel state information according to the packet received by the second antenna.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
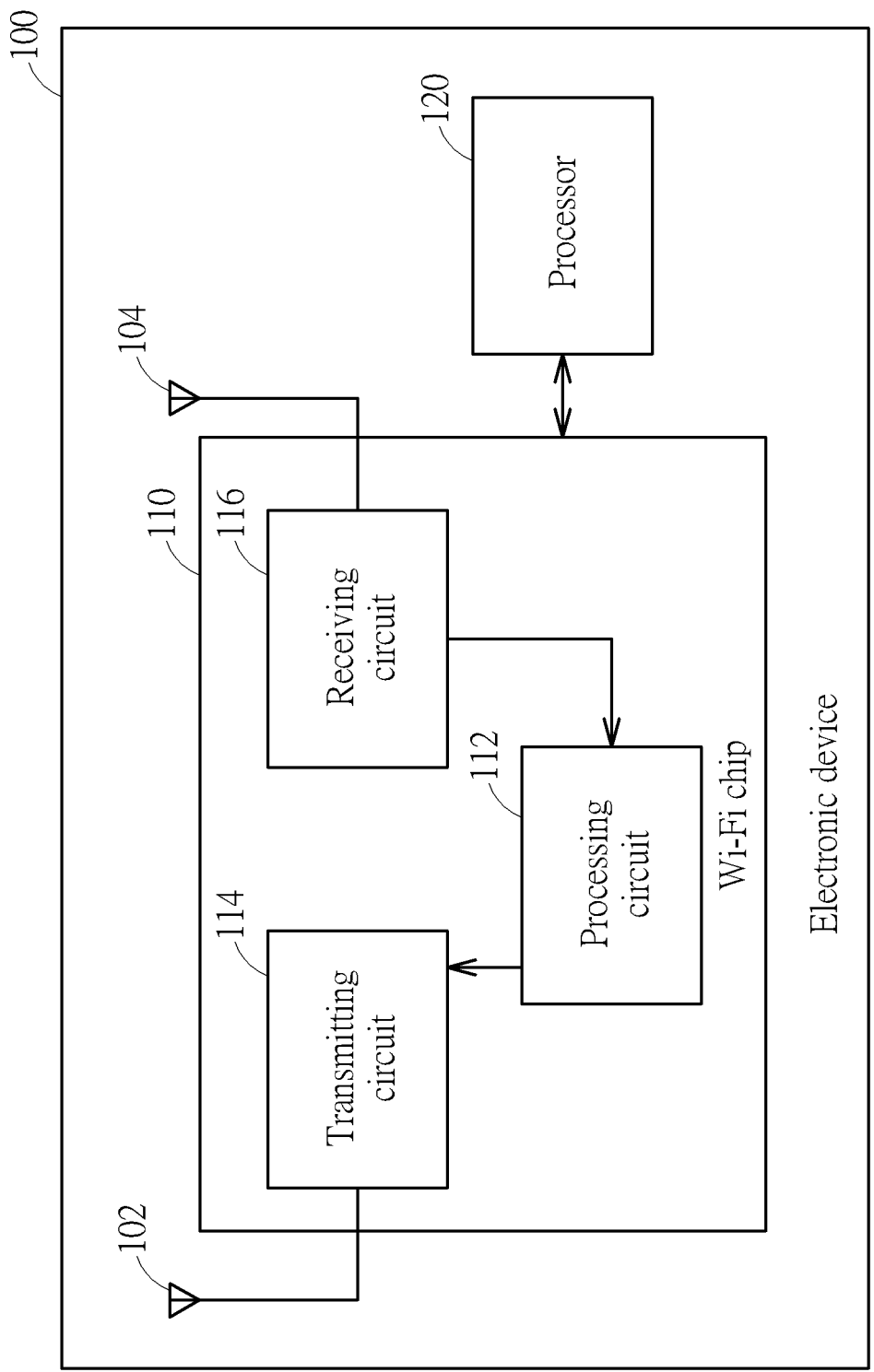
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a wireless communication chip (in this embodiment, a Wi-Fi chip 110 serve as the wireless communication chip), a processor 120 and at least two antennas 102 and 104, wherein the Wi-Fi chip 110 comprises a processing circuit 112, a transmitting circuit 114 and a receiving circuit 116, the transmitting circuit 114 is coupled to the antenna 102, and the receiving circuit 116 is coupled to the antenna 104. In this embodiment, the electronic device 100 can be an access point, a router, a computer, a television or any other electronic device capable of wirelessly communicating with other devices.

In this embodiment, the Wi-Fi chip 110 is configured to continuously use two antennas 102 and 104 within the electronic device to obtain the CSI, for the Wi-Fi chip 110 or the processor 120 to do the sensing detection (e.g., user behavior recognition). Specifically, the processing circuit 112 controls the transmitting circuit 114 to broadcast packets through the antenna 102, and the receiving circuit 116 receives these packets from the antenna 104. Then, the processing circuit 112 calculates the CSI based on data of the broadcasted packets and data of the received packets. In detail, the relationship between the broadcasted data and the received data can be expressed as y=H*x+n, wherein 'x' represents the data of the broadcasted packet, 'y' represents the data of the received packet, 'n' represents noise, and 'H' represents the CSI. In addition, the CSI have amplitude components (i.e. read part) and phase components (i.e., imaginary part), and the CSI can be represented as a matrix.

When the transmitting circuit 114 broadcasts one packet, the receiving circuit 116 may receive the packet via multiple paths, for example, a light-of-sight (LOS) propagation path and many reflection paths, and the CSI determined by the processing circuit 112 is based on signal strengths of these paths. Therefore, when the electronic device 100 is located in a stable environment, the processing circuit 112 may always determine the similar CSI (i.e., the CSI changes slightly); and if the environment changes, for example a person enters a room, the processing circuit 112 may determine a different CSI, so the Wi-Fi chip 110 or the processor 120 can detect the environment variation based on the difference between the CSIs.

In light of above, the embodiment shown in FIG. 1 uses only one electronic device 100, instead of two devices, to obtain the CSI to detect the environment variation. Therefore, it is easy for the user to use the electronic device 100 do the sensing detection.

Figure 2:
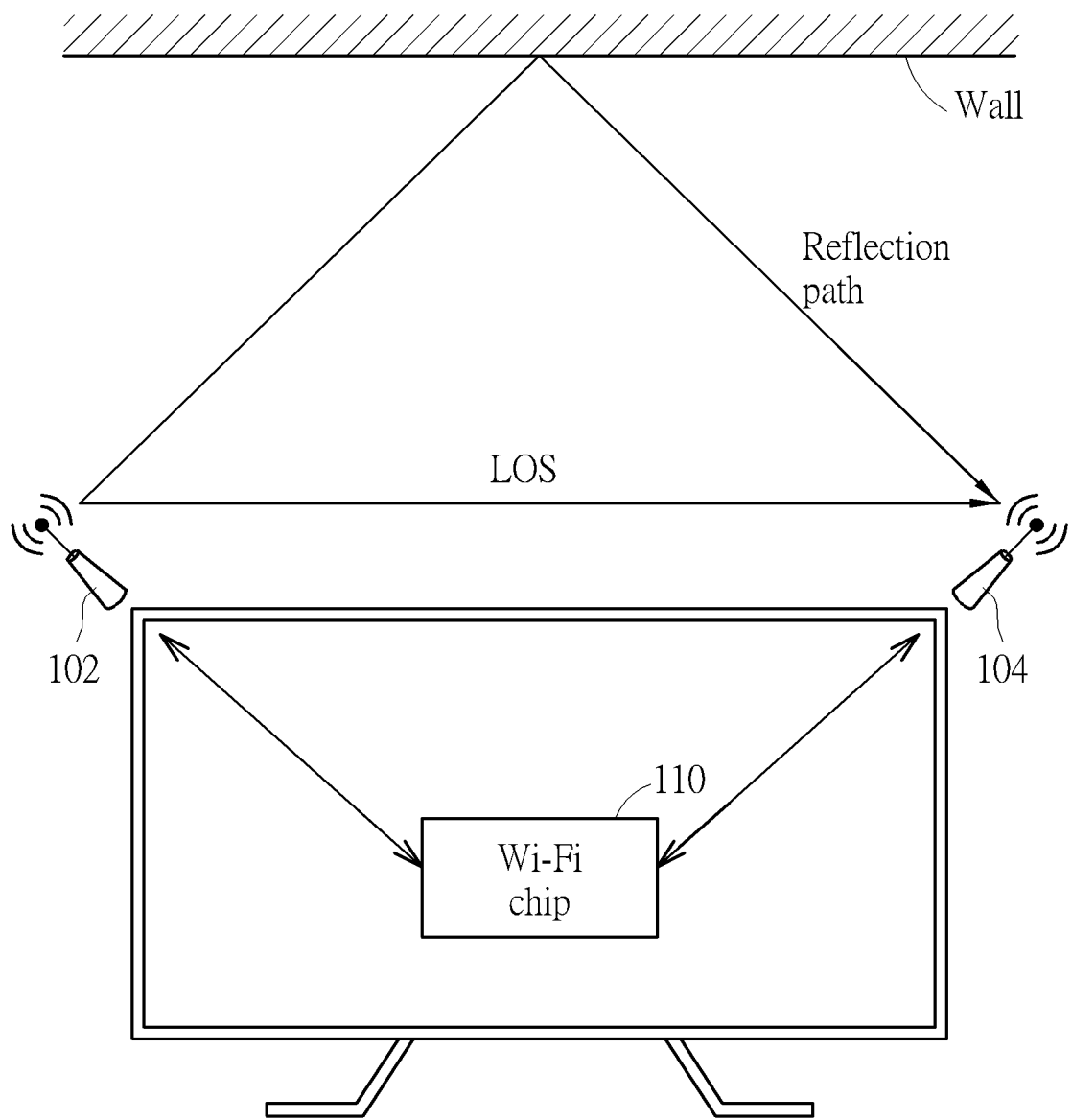
FIG. 2 shows arrangements of the antennas according to one embodiment of the present invention.

FIG. 2 shows arrangements of the antennas 102 and 104 according to one embodiment of the present invention. As shown in FIG. 2, the electronic device 100 can be implemented by a television, and the antenna 102 is located in the upper left corner of the television, and the antenna 104 is located in the upper right corner of the television. The signals received by the antenna 104 may comprise a LOS propagation path and at least one reflection path, and/or diffraction paths and/or refracted paths, and the processing circuit 112 can use the signals corresponding to the LOS propagation path and the other paths to determine the CSI.

In the embodiment shown in FIG. 2, because the LOS propagation path indicates that the signal travels in a direct path from the antenna 102 to the antenna 104, the LOS propagation path corresponds to highest power. For the detection of the CSI variation, the LOS propagation path may increase the complexity of determining the CSI variation. To solve this problem, the electronic device 100 is further designed to lower the energy of the LOS propagation path, as shown in FIG. 3 and FIG. 4.

Figure 3:
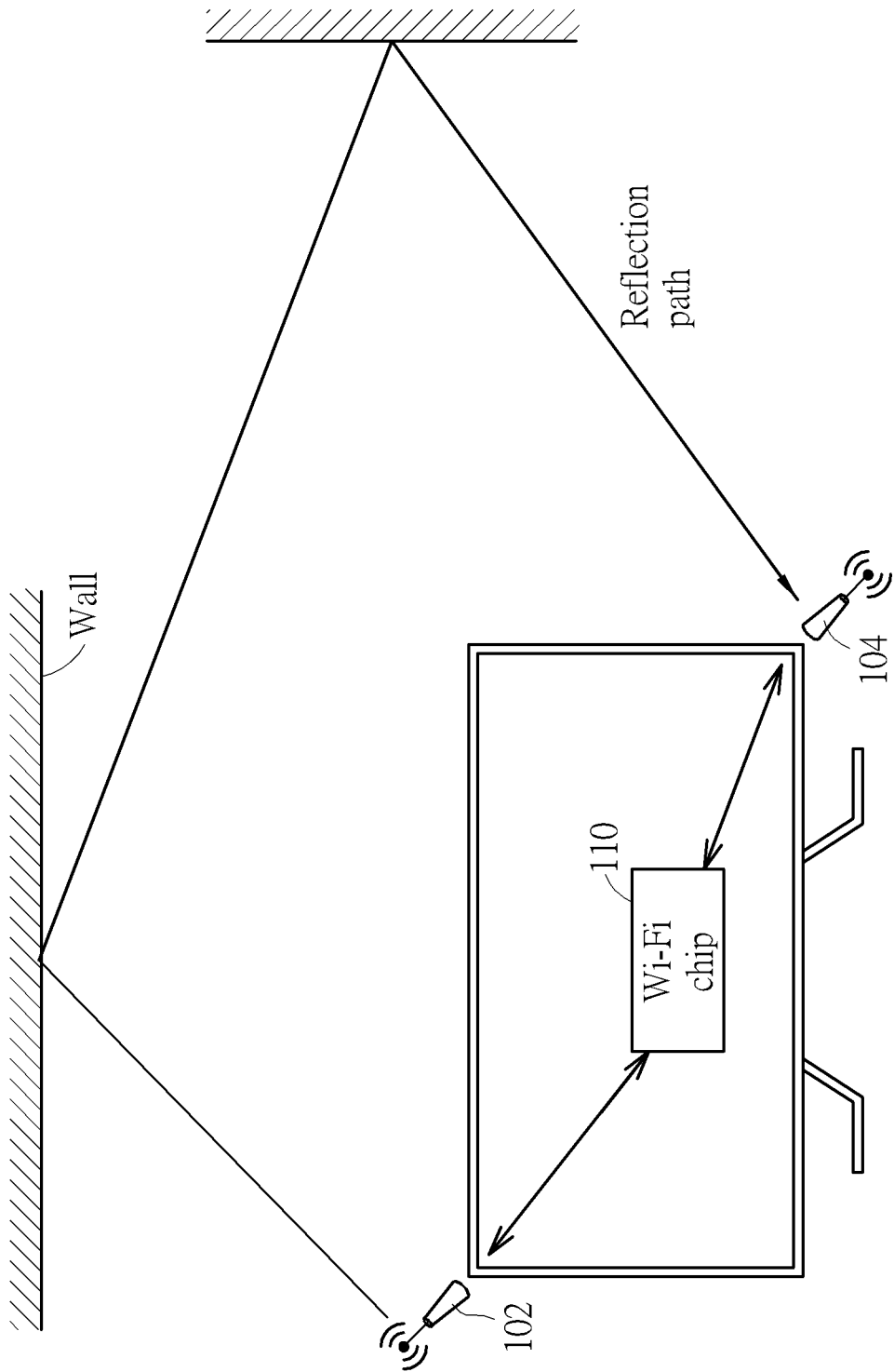
FIG. 3 shows arrangements of the antennas according to another embodiment of the present invention.

FIG. 3 shows arrangements of the antennas 102 and 104 according to another embodiment of the present invention. As shown in FIG. 3, the electronic device 100 can be implemented by a television, and the antenna 102 is located in the upper left corner of the television, the antenna 104 is located in the lower right corner of the television. In this embodiment, there is no LOS propagation path for the antennas 102 and 104, so the signals received by the antenna 104 may only correspond to reflection paths, diffraction paths and/or refracted paths, and the processing circuit 112 can use the signals corresponding to the paths without the LOS propagation path to determine the CSI. Because none of the signals received by the antenna 104 is from the LOS propagation path with high power, the energy of each subcarrier received by the antenna 104 is clearer for the processing circuit 112, and it is convenient to determine the CSI variation.

It is noted that the arrangements of the antennas 102 and 104 shown in FIG. 3 is for illustrative only. In other embodiments of the present invention, as long as the signal received by the antenna 104 do not correspond to the LOS propagation path, the antennas 102 and 104 can be set anywhere in the television. For example, the antenna 102 can be located in the lower right corner of the television while the antenna 104 is located in the upper left corner of the television; or the antenna 102 can be located in the lower left corner of the television while the antenna 104 is located in the upper right corner of the television; or the antenna 102 can be located in the upper right corner of the television while the antenna 104 is located in the lower left corner of the television; or the antenna 102 is located in the upper left corner of the television, and the antenna 104 is located on the right side or lower side of the television; or the antenna 102 is located in the upper right corner of the television, and the antenna 104 is located on the left side or lower side of the television; or the antenna 102 is located in the lower left corner of the television, and the antenna 104 is located on the right side or upper side of the television; or the antenna 102 is located in the lower right corner of the television, and the antenna 104 is located on the left side or the lower side of the television; or the antenna 102 is located on one of the upper side and lower side of the television, and the antenna 104 is located on the other one of the upper side and lower side of the television; or the antenna 102 is located on one of the right side and left side of the television, and the antenna 104 is located on the other one of the right side and left side of the television.

Figure 4:
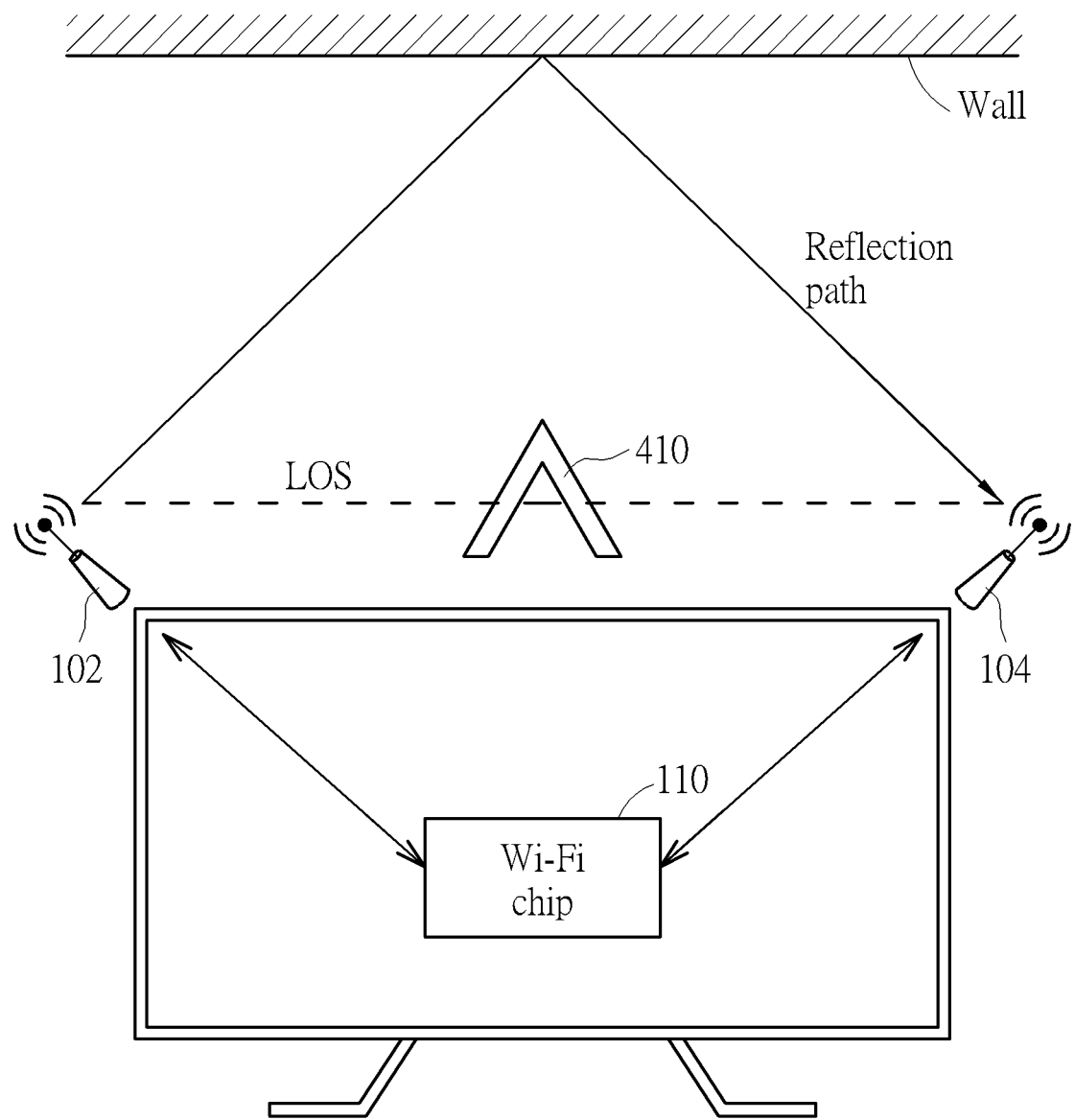
FIG. 4 shows arrangements of the antennas according to another embodiment of the present invention.

FIG. 4 shows arrangements of the antennas 102 and 104 according to another embodiment of the present invention. As shown in FIG. 4, the electronic device 100 can be implemented by a television, and the antenna 102 is located in the upper left corner of the television, the antenna 104 is located in the upper right corner of the television, and a barrier 410 such as an iron sheet is positioned on the LOS propagation path between the antennas 102 and 104. In this embodiment, because of the barrier 410 positioned on the LOS propagation path, it can be considered that there is no LOS propagation path for the antennas 102 and 104, so the signals received by the antenna 104 may only correspond to reflection paths, diffraction paths and/or refracted paths, and the processing circuit 112 can use the signals corresponding to the paths without the LOS propagation path to determine the CSI. Because none of the signals received by the antenna 104 is from the LOS propagation path with high power, the energy of each subcarrier received by the antenna 104 is clearer for the processing circuit 112, and it is convenient to determine the CSI variation.

In another embodiment of the present invention, the energy of the signal corresponding to the LOS propagation path can be lowered by controlling the antennas 102 and 104. For example, the Wi-Fi chip 110 may change the antenna isolation by controlling the polarization direction of the directional antenna, or the Wi-Fi chip 110 may use digital compensation to lower the energy of the signal corresponding to the LOS propagation path.

Briefly summarized, in the CSI measurement method of the present invention, by controlling one antenna of the electronic device to broadcast packets and controlling another antenna of the electronic device to receive the packets to calculate the CSI, the user can easily use only one electronic device to do the sensing detection. In one embodiment, by designing the electronic device to lower the energy of signal corresponding to the LOS propagation path, the energy of each subcarrier received by the antenna is clearer, and it is convenient to determine the CSI variation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An electronic device, comprising:
a first antenna;
a second antenna;
a wireless communication chip, configured to control the first antenna to broadcast a packet, control the second antenna to receive the packet broadcasted from the first antenna, and determine channel state information according to the packet received by the second antenna; and a barrier, positioned on light-of-sight propagation path between the first antenna and the second antenna.

2. The electronic device of claim 1, wherein there is no light-of-sight propagation path between the first antenna and the second antenna.

3. The electronic device of claim 1, wherein the barrier is used to prevent a signal travels in a direct path from the first antenna to the second antenna.

4. The electronic device of claim 1, wherein the barrier is an iron sheet.

5. The electronic device of claim 1, wherein the electronic device is a television, the first antenna is located in one of an upper left corner and a lower right corner of the television, and the second antenna is located in the other one of the upper left corner and the lower right corner of the television; or the first antenna is located in one of an upper right corner and a lower left corner of the television, and the second antenna is located in the other one of the upper right corner and the lower left corner of the television.

6. The electronic device of claim 1, wherein the electronic device is a television, the first antenna is located on one of a right side and a left side of the television, and the second antenna is located on the other one of the right side and the left side of the television; or the first antenna is located on one of an upper side and a lower side of the television, and the second antenna is located on the other one of the upper side and the lower side of the television.

7. The electronic device of claim 1, wherein the wireless communication chip adjusts an antenna isolation by controlling polarization direction(s) of at least one of the first antenna and the second antenna to lower energy corresponding to a light-of-sight propagation path between the first antenna and the second antenna.

8. The electronic device of claim 1, wherein the wireless communication chip continuously control the first antenna to broadcast packets, control the second antenna to receive the packets broadcasted from the first antenna, and determine multiple channel state information according to the packets received by the second antenna; and the electronic device further comprises:

a processor, coupled to the wireless communication chip, configured to detect environment variation according to variation of the multiple channel state information.

9. A wireless communication chip, comprising:

a transmitting circuit, arranged to couple to a first antenna external to the wireless communication chip;

a receiving circuit, arranged to couple to a second antenna external to the wireless communication chip; and a processing circuit, configured to control the transmitting circuit to broadcast a packet via the first antenna, control the receiving circuit to receive the packet via the second antenna, and determine channel state information according to the packet received by the receiving circuit;

wherein the receiving circuit does not receive packet from a light-of-sight propagation path between the first antenna and the second antenna.

10. The wireless communication chip of claim 9, wherein the processing circuit continuously controls the transmitting circuit to broadcast packets via the first antenna, controls the receiving circuit to receive the packets via the second antenna, and determine multiple channel state information according to the packets received by the receiving circuit.

11. The wireless communication chip of claim 9, wherein the wireless communication chip is positioned in an electronic device comprising the first antenna and the second antenna.

12. The wireless communication chip of claim 9, wherein the electronic device is a television.

13. The wireless communication chip of claim 9, wherein the processing circuit adjusts an antenna isolation by controlling polarization direction(s) of at least one of the first antenna and the second antenna to lower energy corresponding to a light-of-sight propagation path between the first antenna and the second antenna.

14. A channel state information measurement method, comprising:

controlling a first antenna within an electronic device to broadcast a packet;

controlling a second antenna within the electronic device to receive the packet; and determining channel state information according to the packet received by the second antenna;

wherein the second antenna does not receive packet from a light-of-sight propagation path between the first antenna and the second antenna.

15. The channel state information measurement method of claim 14, further comprising:

continuously controlling the first antenna within the electronic device to broadcast packets;

continuously controlling the second antenna within the electronic device to receive the packets; and determining multiple channel state information according to the packets received by the second antenna.

16. The channel state information measurement method of claim 14, further comprising:

adjusting an antenna isolation by controlling polarization direction(s) of at least one of the first antenna and the second antenna to lower energy corresponding to a light-of-sight propagation path between the first antenna and the second antenna.

17. The channel state information measurement method of claim 14, wherein the channel state information measurement method is performed by a wireless communication chip positioned in a television comprising the first antenna and the second antenna.

\* \* \* \* \*